United States Patent [19]
Lai et al.

[11] Patent Number: 5,825,562
[45] Date of Patent: Oct. 20, 1998

[54] METHOD OF CONTINUOUS MOTION FOR PROLONG USAGE OF OPTICAL ELEMENTS UNDER THE IRRADIATION OF INTENSIVE LASER BEAMS

[75] Inventors: Ming Lai, Carlsbad; Shui Lai, Encinitas; Zhiming Ou, Carlsbad, all of Calif.

[73] Assignee: Novatec Corporation, Carlsbad, Calif.

[21] Appl. No.: 912,738

[22] Filed: Aug. 18, 1997

[51] Int. Cl.[6] ................................................ G02B 7/02
[52] U.S. Cl. .......................................... 359/822; 359/813
[58] Field of Search .................................. 359/819, 822, 359/813, 823

[56] References Cited

U.S. PATENT DOCUMENTS 3,826,578  7/1974  King et al. .............................. 356/237
5,401,948  3/1995  Krichever et al. ...................... 359/205

Primary Examiner—Georgia Epps
Assistant Examiner—Ricky Mack
Attorney, Agent, or Firm—Frank D. Gilliam

[57] ABSTRACT

A method and apparatus are described for prolonging the usage life of an optical element under the irradiation of an intensive laser beam. The method employs a continuous mechanical motion to enlarge the effective interaction area and the volume of the laser beam within the optical element. In an embodiment, the apparatus is used for harmonic generation of a laser beam within a BBO crystal. A motor is used to drive the BBO crystal mounted on a pair of translation slides. The crystal is moved on a circular path spiraling within a predetermined area while its optical axis remains in the same orientation in relation to a laser beam. The phase matching angle of the BBO is maintained during the movement, and the usage life of the BBO crystal is increased by many orders of magnitude.

14 Claims, 2 Drawing Sheets

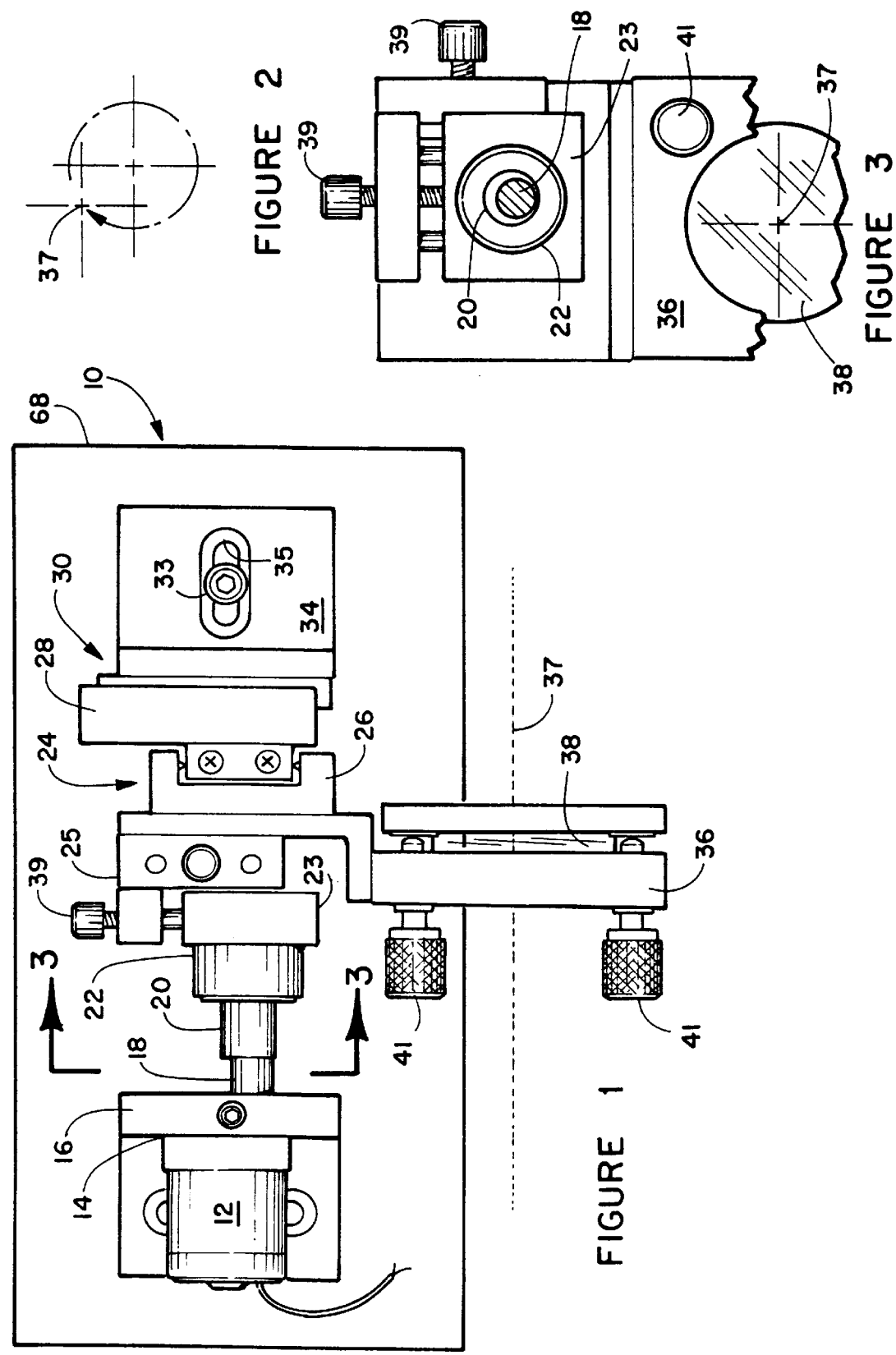

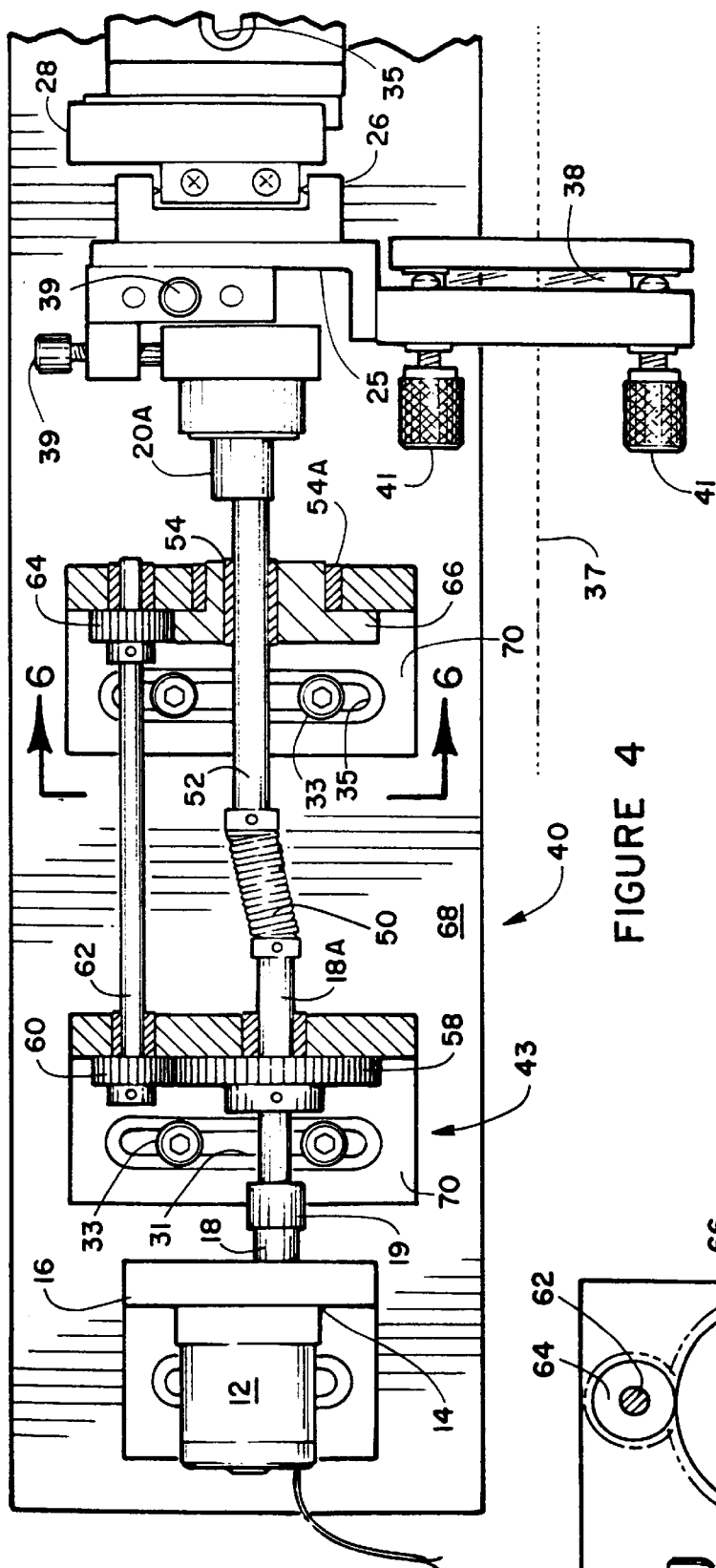
FIGURE 4
FIGURE 5
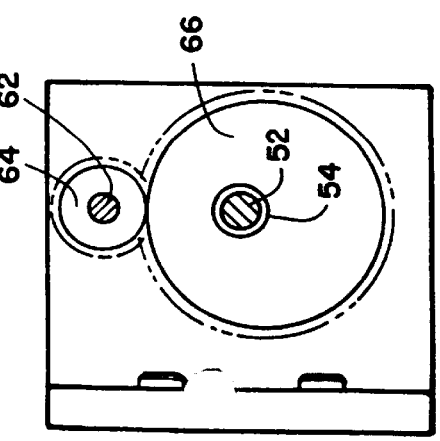
FIGURE 6

METHOD OF CONTINUOUS MOTION FOR PROLONG USAGE OF OPTICAL ELEMENTS UNDER THE IRRADIATION OF INTENSIVE LASER BEAMS

FIELD OF THE INVENTION

The present invention relates to prolong the usage life of an optical element under the irradiation of an intensive laser beam by continuous movement of the optical element. In particular, the present invention relates to a delay or complete elimination of laser beam damage on nonlinear optical crystals, such as BBO, LBO, KTP, KD*P, and KDP.

BACKGROUND OF THE INVENTION

When a nonlinear optical crystal or any optical element is intensively irradiated by a laser beam, the performance of the crystal or optic element may degrade with time. The higher the incident laser beam intensity, the faster it degrades. This degradation process is usually referred to as laser induced damage. Laser induced damage may happen on the surface of or inside an optical element.

There are many mechanisms leading to laser induced damage in optical elements. The damage can be attributed to the extremely high electromagnetic field, thermal effect or acoustical shocks of the laser beam. Laser damage may depend on the intensity of the laser beam, laser pulse energy, laser wavelength, the optical element substrate, the surface quantity of the optics.

A great deal of effort has been made to avoid laser induced damage. This effort focuses on searching for new optical materials or crystals, improving the quality of optic's substrates and surfaces and making better protective coatings. This effort has made great progress, but limitations on laser beam intensity remains.

In many laser applications, intensive laser beams on optical elements are inevitable. One example is in a process of non-linear optical conversion, in which a higher than normal intensity laser beam is preferred for a higher conversion efficiency. Another example is in the delivery arm of a deep UV laser beam for material ablation, in which a high intensity UV beam is required for achieving laser ablation. Therefore, a method for lengthening the usage life of these optical elements is strongly desirable.

The present invention provides a new means and method for prolonging the useful life of optical elements by using continuous motion of the optics during use with a laser beam passing therethrough.

SUMMARY OF THE INVENTION

Many laser induced damages do not happen immediately or in a single shot of a laser pulse. In many circumstances, laser induced damage can be minimized or eliminated if the laser exposure time is made short or the time interval between the exposures is long compared to the thermal or acoustic wave relaxation time of the optical element. The present invention using continuous motion for prolonging the usage life of optical elements addresses these laser damage issues.

In one preferred embodiment of the present invention, a nonlinear BBO crystal is scanned about a stationary laser beam continuously in a circular area and the usage life of the crystal has been increased significantly. The present invention enables a much larger interaction area of the laser beam on the crystal surface. It also increases the time interval for laser induced thermal or mechanical impacts to relax at any specific spot on the crystal surface.

For the purpose of nonlinear laser wavelength conversion, such as harmonic generation within a BBO crystal, it is important that the crystal axis remains in the same orientation during the movement. In this preferred embodiment of the present invention, a pair of mechanical transitional slides are used to provides a smooth motion and yet tight tolerance against any rotational (orientation) distortion. The two slides are fixed to each other such that they slide in two orthogonal directions. The crystal is mounted on a first slide and the second slide is fixedly attached to a stationary support. The crystal on the first slide can then make only parallel mechanical movement with respect to the stationary support. The orientation or the phase matching angle of the crystal thus remains unchanged during its movement. This condition is critical for achieving an optimum conversion efficiency in a wavelength conversion process.

We have found that it is convenient and reliable to use only a single motor to drive the first slide and attached crystal in a circular path or in a circular area. The advantage of a circular motion is that the motion is smooth and it is easy to achieve mechanically. With the motion in a circular area, interaction area of the laser beam on the crystal surface is continually repositioned extending the useful life of the crystal.

Obviously, it can likewise prolong the usage life of an optical element by continuously moving the intensive laser beam instead of moving the element as described in U.S. Pat. No. 5,280,491 which teaches directing a laser beam from a cavity or by moving the laser beam in other different patterns.

The scope of this invention should thus be extended to any relative movement between the optical element and the intensive laser beam.

The invention method and apparatus for prolonging the useful life of optical elements under the irradiation of intensive laser beams can be applied to any form of relative motion and varieties of optical elements and laser beams.

Accordingly, it is an objective of the present invention to provide a new and improved method and apparatus of continuous motion for prolonging the usage life of optical elements under the irradiation of intensive laser beams. It is another object of the present invention to provide a new and simple mechanical apparatus of continuous motion for prolonging the usage life of optical elements under the irradiation of intensive laser beams.

It is a further object of the present invention to provide a simple mechanical apparatus with two orthogonal translation slides for maintaining the orientation of the optical element during its movement.

It is still another object of the present invention to provide a simple mechanical apparatus with only one motor to drive the optical element moving on a circle or in a circular area.

These and other objects of the invention will become apparent to those skilled in the art after considering the following drawing figures and detailed description.

BRIEF DESCRIPTION OF THE FIGURES

FIG. 1 is a top plan showing of one embodiment of the invention for moving a optical element through a circle;

FIG. 2 is the circular pattern of the optical element produced by the device of FIG. 1;

FIG. 3 is a showing along lines 3—3 of FIG. 1;

FIG. 4 is top plan showing of a second embodiment of the invention for moving a optical element through a spiral;

FIG. 5 is the circular pattern of the optical element produced by the device of FIG. 4; and FIG. 6 is a showing along lines 6—6 of FIG. 4.

DETAIL DESCRIPTION OF THE FIGURES

Referring now specifically to drawing FIGS. 1–3 showing a first embodiment of the apparatus 10 of the invention, comprising a motor 12 fixedly attached within an aperture 14 through a bracket 16 with the motor shaft 18 attached off center of an adapter 20. The adapter 20 is then fitted into the center of a bearing 22. The bearing 22 is mounted on positioning adapter 23 which is adjustably connected to portion 25 of a first slide 24, of the type RSI-1, manufactured by Del-Tron Products, Inc. or an equivalent thereto. The portion 25 of this first slide is connected to both portions 23 and 26 of the first slide 24. Portion 26 translatably engages a portion 28 of a second slide 30. The portion 32 of the second slide 30 is fixedly attached to a bracket 34. The bracket 34 is positionable relative to first slide 24 by the loosening of cap screw 33 and sliding the portion 34 along slot 35 and retightening cap screw 33. A mount 36 of the type KM2 manufactured by Thorlabs, Inc. or an equivalent thereto is used for mounting an optical element 38 which is attached to part 26 of the first slide 24. Slides 24 and 30 can slide along vertical and horizontal directions respectively causing the mount 36 to move the optical element 38 as shown in FIG. 2.

When the motor 12 rotates, the optical element 38 will move on a circle with its radius defined by the off-set of adapter 20. If the element 38 is a nonlinear optical crystal as is in a set-up for laser wavelength conversion, the XY axis of the crystal 38 will remain in the same orientation during the movement. Consequently, while the continuous movement prolongs the usage lifetime of the crystal, it will not disturb the phase matching angle and the conversion efficiency can remain optimum.

Adjustments of the slides for adjustment positioning of the optical mount 36 relative to the laser beam 37 are preformed by the adjustment screws 39 on the slide elements 23 and 25. The proper angle of the optical element 38 relative to the laser beam is accomplished by the adjustment screws 41.

Referring now specifically to drawing FIGS. 4–6, the optical element 38 may be scanned continuously in different patterns. FIG. 5 shows a spiral and circular movement of the optical element 38 with operation of the FIG. 4 embodiment. The apparatus described in FIG. 1 is for achieving the circular movement and the addition of an additional concentric element acting on the pair of slides add the spiral motion.

The second preferred embodiment 40 is of an apparatus for practicing the invention for moving a crystal in a combined circular and spiral area as shown in FIG. 5. Comparing the apparatus of the FIG. 5 embodiment with the apparatus of the FIG. 1 embodiment, a motor gear assembly 43 is inserted between the motor shaft 18, coupler 19 and the off-center adapter 20A. A motor 12 is fixedly attached to a bracket 16 through an aperture 14 (not shown). The motor rotating shaft 18A which is an extension of motor shaft 18 is coupled to a flexible bellow coupler 50 through coupler 19 with the opposite end of the coupler 50 connected to a shaft 52. The shaft 52 is passes off-center through a bearings 54 in gear 66 and is fixedly attached at its opposite end to a second off-set concentric adapter 20A. The off center off-set at gear 66 and the off-set of coupler 20A drive a pair of translation slides 24 and 30 causeing the optical element 38 to follow the pattern shown in FIG. 5.

Again referring to FIG. 4, the motor shaft 18 is also fixedly attached to a gear 58. The gear 58 meshes with a second gear 60 thereby coupling the rotation of gear 58 to gear 60. The gear 60 is fixedly attached to a shaft 62 as is the gear 64 which couples the rotation of the gear to gear 66, through which the bearing 54 is off-set mounted. As the gear 66 rotates, it causes the bearing 54 and thus the shaft 52 to move on a circle. Therefore, when the motor shaft 18 turns, the shaft 52 makes two motions simultaneously: an axial rotation driven by the flexible bellow coupler 50 and a rotation motion on a circle driven by the gear 66. Any optical element 38 affixed to part 26 of the first slide 24 will then make a combined motion of two circular motions. The axial rotation of the shaft 52 drives the second off-set adopter 20A to make a motion on a first circle. The excentric rotary motion of the shaft 52 driven by the center off-set of gear 66 causes the center of the first circle to move on a second circle. The optical element 38 affixed to the part 25 will move on a pattern as shown in FIG. 5 if the off-set of the adopter 20A is larger than the off-set of the gear 66. The optical element will move along different patterns if the relative sizes of the two offsets are changed.

In both the FIG. 1 and FIG. 4 embodiments of the invention the various elements are fixed in place on a base member 68. The alignment of the various components of the FIG. 4 embodiment is accomplished by the translation of the gear blocks 70 along slots 31 by the loosening of cap screws 33 and after proper translation alignment retightening the cap screws 33.

It should be understood that a selected number of additional offsets 20 could be added in line with the two discussed to provide various different patterns of movement to the optic element.

As fore mentioned, the use of the apparatus for moving an cavity exiting laser beam can be found in U.S. Pat. No. 5,280,491.

It should also be understood that both the optic means and the laser beam can be simultaneously moved.

From the foregoing description it will be apparent that there has been provided an apparatus and method for extending the useful life of an optic element used with a laser beam.

We claim:

1. Apparatus for prolonging the usage life of an optical element under the irradiation of an intensive laser beam comprising:

said intensive laser beam being fixedly directed in a predetermined direction toward and passing through said optical element; and means for providing selective relative movement between said optical element and said intensive laser beam such that said intensive laser beam continually passes along a different path through said optical element without changing the axial orientation of said optical element relative to the direction of said intensive laser beam.

2. The invention as defined in claim 1 wherein said optical element is a nonlinear optical crystal, selected from the group consisting of BBO, LBO, KTP, KD*P, and KDP crystals.

3. The invention as defined in claim 1 wherein said optical element is a UV optic.

4. The invention as defined in claim 1 wherein said optical element is a laser crystal is one selected from the following group of laser crystals consisting of Nd:YLF, Cr:LiSAF and Ho:YAG.

5. The invention as defined in claim 1 wherein said laser beam is a CW laser.

6. The invention as defined in claim 1 wherein said laser beam is a pulsed laser.

7. The invention as defined in claim 6 wherein said pulsed laser has a pule duration in the range of 1 fs to 10 ms.

8. The invention as defined in claim 1 wherein said intensive laser beam has a wavelength ranging from 10 nm to 10 microns.

9. The invention as defined in claim 1 wherein said means for providing relative movement between said optical element and said laser beam comprises mechanical movement of said optics.

10. The invention as defined in claim 9 wherein said mechanical device is operated by a single motor.

11. The invention as defined in claim 9 wherein said means for moving said optical element comprises two translation slides.

12. The invention as defined in claim 1 wherein said means for moving said optical element moves said optical element in a circular path relative to said high intensity laser beam.

13. The invention as defined in claim 1 wherein said means for moving said optical element moves said optical element covering a circular area relative to said high intensity beam.

14. A method for prolonging the usage life of an optical element under the irradiation of an intensive laser bean comprising:
   providing an intensive laser beam directed in a predetermined direction toward and passing through said optical element; and
   selecting means for providing relative movement of said optical element relative to said intensive laser beam such that said intensive laser beam continually passes along a changing path through said optical element without changing the axial orientation of said optical element relative to the direction of said intensive laser beam.

* * * * *

UNITED STATES PATENT AND TRADEMARK OFFICE
CERTIFICATE OF CORRECTION

PATENT NO. : 5,825,562
DATED : 10/20/98
INVENTOR(S) : MING LAI and ZHIMIN QU

It is certified that error appears in the above-identified patent and that said Letters Patent is hereby corrected as shown below:

Cover page, item #75, delete "Zhiming Ou" and replace with --Zhimin Qu--

Cover page, Element #73, delete "Novătec Corporation" and replace with --Novatec Laser Systems, Inc.--

Signed and Sealed this

Fourth Day of May, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO. : 5,825,562
DATED : Oct. 20, 1998
INVENTOR(S) : Ming Lai, et al

It is certified that error appears in the above-identified patent and that said Letters Patent is hereby corrected as shown below:

On cover page, item [73] delete "Novatec Corporation" should read --Novatech Laser Systems, Inc.--

Signed and Sealed this

Nineteenth Day of October, 1999

Attest:

Q. TODD DICKINSON

Attesting Officer

Acting Commissioner of Patents and Trademarks